United States Patent
Ren et al.

(10) Patent No.: US 9,313,460 B2
(45) Date of Patent: *Apr. 12, 2016

(54) DEPTH-AWARE BLUR KERNEL ESTIMATION METHOD FOR IRIS DEBLURRING

(75) Inventors: Liu Ren, Sunnyvale, CA (US); Xinyu Huang, Norfolk, VA (US); Ruigang Yang, Lexington, KY (US)

(73) Assignee: Robert Bosch GmbH, Stuttgart (DE)

( * ) Notice: Subject to any disclaimer, the term of this patent is extended or adjusted under 35 U.S.C. 154(b) by 813 days.

This patent is subject to a terminal disclaimer.

(21) Appl. No.: 13/525,511

(22) Filed: Jun. 18, 2012

(65) Prior Publication Data
US 2013/0147937 A1    Jun. 13, 2013

Related U.S. Application Data

(63) Continuation of application No. 12/367,069, filed on Feb. 6, 2009, now Pat. No. 8,203,602.

(51) Int. Cl.
*G06K 9/00* (2006.01)
*H04N 7/18* (2006.01)
*G06T 5/00* (2006.01)

(52) U.S. Cl.
CPC .............. *H04N 7/18* (2013.01); *G06K 9/00604* (2013.01); *G06T 5/003* (2013.01); *G06T 2207/10016* (2013.01); *G06T 2207/10028* (2013.01); *G06T 2207/10048* (2013.01); *G06T 2207/30201* (2013.01)

(58) Field of Classification Search
CPC  H04N 7/18; G06T 5/003; G06T 2207/10016; G06T 2207/10028; G06T 2207/10048; G06T 2207/30201; G06K 9/00604
USPC .............. 348/78, 77; 382/254, 260, 263, 264, 382/255, 115–127; 340/5.52, 5.53, 5.82, 340/5.83

See application file for complete search history.

(56) References Cited

U.S. PATENT DOCUMENTS

| | | | | |
|---|---|---|---|---|
| 7,912,252 | B2 * | 3/2011 | Ren et al. | 382/117 |
| 8,050,463 | B2 * | 11/2011 | Hamza | 382/115 |
| 8,059,870 | B2 * | 11/2011 | Ren et al. | 382/117 |
| 8,203,602 | B2 * | 6/2012 | Ren et al. | 348/78 |

(Continued)

OTHER PUBLICATIONS

Xinyu Huang et al.; Image Deblurring for Less Intrusive Iris Capture; IEEE Conference on Computer Vision and Pattern Recognition, 2009; pp. 1558-1565; Jun. 2009.*

*Primary Examiner* — Kenneth R Coulter
(74) *Attorney, Agent, or Firm* — Maginot, Moore & Beck LLP

(57) ABSTRACT

Estimating a blur kernel distribution for visual iris recognition includes determining a first mathematical relationship between an in-focus position of a camera lens and a distance between the lens and an iris whose image is to be captured by the lens. A second mathematical relationship between the in-focus position of the lens and a standard deviation defining a Gaussian blur kernel distribution is estimated. The first mathematical relationship is used to ascertain a desired focus position of the lens based upon the actual position of the living being's eye at the point in time. The second mathematical relationship is used to calculate a standard deviation defining a Gaussian blur kernel distribution. The produced image is digitally unblurred by using the blur kernel distribution defined by the calculated standard deviation.

19 Claims, 12 Drawing Sheets

(56) References Cited

U.S. PATENT DOCUMENTS

| | | | |
|---|---|---|---|
| 8,374,389 B2* | 2/2013 | Ren et al. | 382/103 |
| 8,565,495 B2* | 10/2013 | Ren et al. | 382/115 |
| 8,755,573 B2* | 6/2014 | Ren et al. | 382/117 |
| 2007/0216798 A1* | 9/2007 | Northcott et al. | 348/370 |
| 2007/0274570 A1* | 11/2007 | Hamza | 382/117 |
| 2010/0202666 A1* | 8/2010 | Ren et al. | 382/117 |
| 2010/0202667 A1* | 8/2010 | Ren et al. | 382/117 |
| 2011/0128365 A1* | 6/2011 | Ren et al. | 348/78 |
| 2012/0027266 A1* | 2/2012 | Ren et al. | 382/117 |

* cited by examiner

DEPTH-AWARE BLUR KERNEL ESTIMATION METHOD FOR IRIS DEBLURRING

CROSS-REFERENCE TO RELATED APPLICATIONS/INCORPORATION BY REFERENCE

This application is a continuation of U.S. patent application Ser. No. 12/367,069, now U.S. Pat. No. 8,203,602, entitled "A DEPTH-AWARE BLUR KERNEL ESTIMATION METHOD FOR IRIS DEBLURRING", filed Feb. 6, 2009. The complete subject matter of this patent application is hereby incorporated herein by reference, in its entirety.

BACKGROUND

1. Field of the Invention

The present invention relates to apparatuses and methods for identifying personnel and, more particularly, to apparatuses and methods for identifying personnel based on visual characteristics of the irises of their eyes.

2. Description of the Related Art

Iris recognition, or "iris capture" is a method of biometric personal identification that uses pattern recognition algorithms based on images of at least one of the irises of an individual's eyes. Iris recognition uses camera technology to produce images of the details of the iris. These images are converted into digital templates and provide mathematical representations of the iris that are used to identify individuals.

Due to hardware limitations, the images that are captured are often blurred. However, iris image deblurring can greatly improve the robustness for less intrusive iris capture systems. Most known iris deblurring algorithms ignore the characteristics of the capture system itself, and focus only on features that are directly computed from the iris images. More particularly, in many iris capture systems, system delay is often seen between the identified capturing event and the real shutter release of the camera. The delay may consist of several parts, the time to drive the lens to the desired position, the time to release the shutter and capture the image, and the time to drive the pan-tilt unit. Therefore, if a user is moving, the focused depth of the camera and the actual depth of the eyes are usually different. When the depth difference is larger than the depth of the field (DOF) of the camera, the defocus blur occurs, which can greatly deteriorate the performance of the iris recognition.

What is neither disclosed nor suggested in the art is a method of iris image deblurring that is able to compensate for focusing characteristics of the camera in cases in which it is not practical to achieve an ideal focus position of the lens before the image is captured.

SUMMARY

The present invention provides a novel method that uses depth information (i.e., the distance from the camera to the user) to estimate the blur kernel parameters for iris deblurring. The method may apply to iris capture systems in which accurate depth information can be acquired. The method of the invention may handle defocus blur when the real focus position cannot be estimated by the depth information because of the typical system delay often seen in iris capture systems. The invention may enable defocus blur to be corrected when the focus position of the camera cannot be adjusted quickly enough to keep up with the movement of the subject.

If the accurate depth information can be acquired in real time, the system can predict the desired focus position based on the speed of the user. Even in this scenario, however, it is possible for the predicted position of the user, and hence the predicted focus position, to still be inaccurate. In some embodiments, the present invention may correct the defocus blur in cases in which the position of the user cannot be predicted with sufficient accuracy to capture the image with an acceptable focus position.

In one embodiment, the present invention comprises a method of estimating a blur kernel distribution for visual iris recognition includes determining a first mathematical relationship between an in-focus position of a camera lens and a distance between the camera and an iris whose image is to be captured by the camera. A second mathematical relationship between the in-focus position of the lens and a standard deviation defining a Gaussian blur kernel distribution is estimated. A position of an eye of a living being at a future point in time is predicted. A focus position of the camera lens is adjusted based upon the predicted position of the eye. The camera lens with the adjusted focus position is used to produce an image of the living being's eye at the point in time. An actual position of the living being's eye at the point in time is sensed. The first mathematical relationship is used to ascertain a desired focus position of the lens based upon the actual position of the living being's eye at the point in time. The second mathematical relationship is used to calculate a standard deviation defining a Gaussian blur kernel distribution. The calculating is based upon a difference between the adjusted focus position and the desired focus position of the lens. The produced image is digitally unblurred by using the blur kernel distribution defined by the calculated standard deviation.

In another embodiment, the present invention comprises a method of visually recognizing an iris. A position of an eye of a living being at a future point in time is predicted. A focus position of a camera lens is adjusted dependent on the predicted position. The camera lens with the adjusted focus position is used to produce an image of the living being's eye at the point in time. An actual position of the living being's eye at the point in time is sensed. A Gaussian blur kernel distribution is determined based upon the adjusted focus position of the camera lens and the actual position of the living being's eye at the point in time. The blur kernel distribution is used to digitally unblur the produced image.

In yet another embodiment, the present invention comprises a method of capturing an image of an iris, including using a camera lens with a focus position to produce an image of a living being's eye. An actual position of the living being's eye is sensed at a point in time at which the camera produced the image of the living being's eye. The produced image is digitally unblurring based upon the focus position of the camera lens, and the actual position of the living being's eye at the point in time.

An advantage of the present invention is that it makes it possible to accurately deblur an iris image that has been captured with a camera focus position that is less than ideal for the distance between the camera and the iris at the moment in time at which the image is captured.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
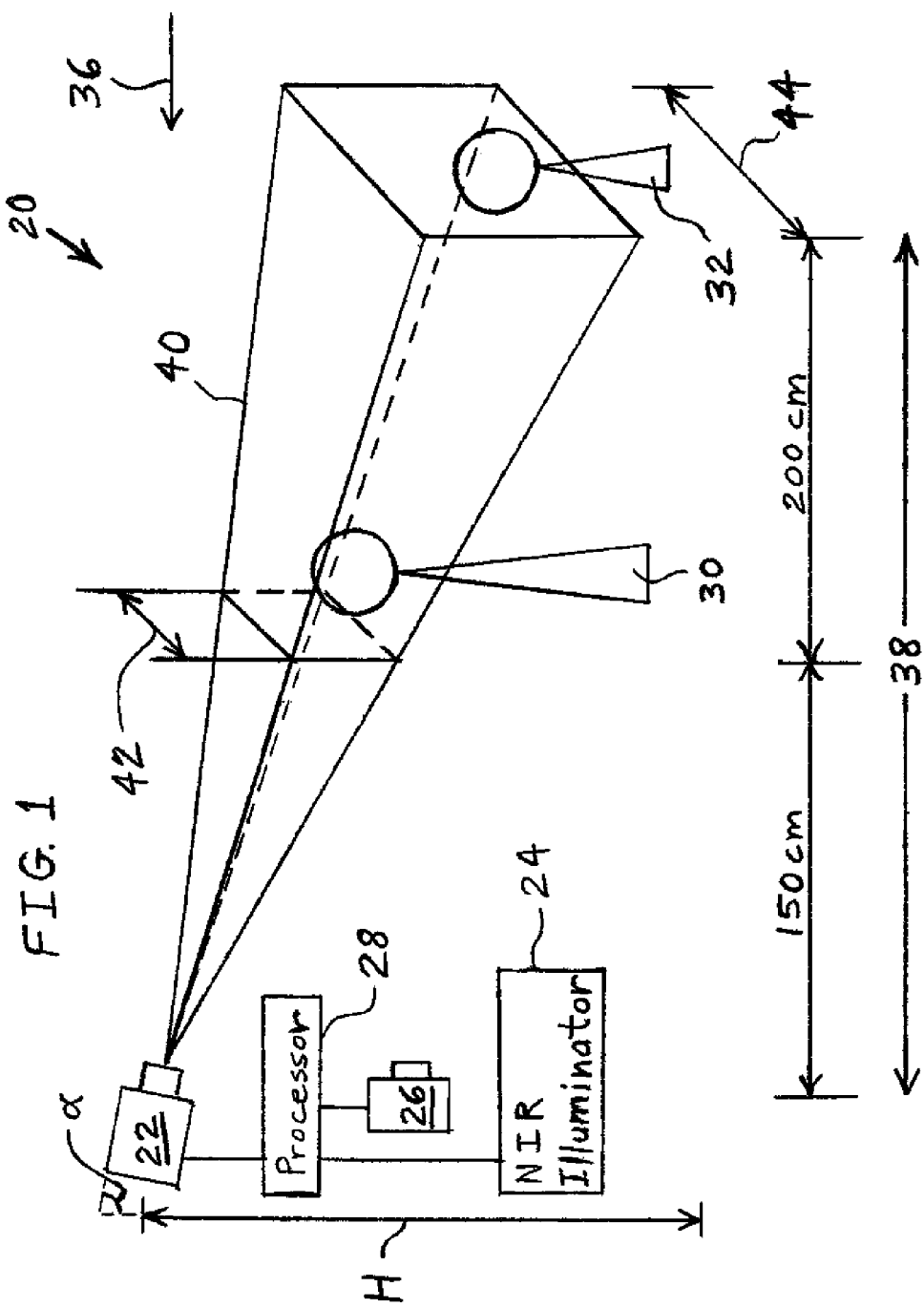
FIG. 1 is a block diagram of one embodiment of an iris capture system according to one embodiment of the invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Turning now to the drawings, and particularly to FIG. 1, there is shown one embodiment of an iris capture system 20 of the present invention including an NFOV NIR camera 22 with adjustable focus, an NIR illuminator 24, and a depth sensor 26 all in electronic communication with a central processor 28. System 20 may capture images of, and detect the positions of, moving subjects such as a human being 30 or a human being 32 when he approaches a doorway at which camera 22, illuminator 24 and sensor 26 are mounted, such as in a direction indicated by arrow 36. Camera 22 may be installed with a mounting height H and tilt angle α such that a standoff distance 38 for the user is approximately between 1.5 meters and 3.5 meters and the captured iris diameter is above 150 pixels. In one embodiment, height H is about 250 centimeters. The width of a capture volume 40 may be on the order of 20 centimeters. In the embodiment illustrated in FIG. 1, a width 42 of capture volume 40 where the image and shape of the taller person 30 are captured is about 17 centimeters, and a width 44 of capture volume 40 where the image and shape of the shorter person 32 are captured is about 30 centimeters. There are many devices known for measuring depth information, such as stereo cameras, time-of-flight sensors, and structure lights.

In embodiments in which NFOV camera 22 does not have panning and tilting capabilities, the human being whose image and shape are being captured needs to look at camera 22 while approaching the doorway. The iris capture may be triggered at different standoff distances for users with different heights.

Depth sensor 26 may be installed at various positions and orientations. Depth sensor 26 may be positioned very close to NFOV camera 22 to allow for a more compact design. NIR illuminator 24 can be placed at any location so long as it illuminates capture volume 40.

System 20 can be applied to other possible settings in which depth sensor 26 is used. For example, camera 22 may be in the form of a high speed, high performance video camera. Alternatively, camera 22 may have a fixed focus or adjustable focus based on the distance between the camera and the user. It is also possible for camera 22 to include pan-tilt capabilities in order to further enlarge the capture volume.

Figure 2:
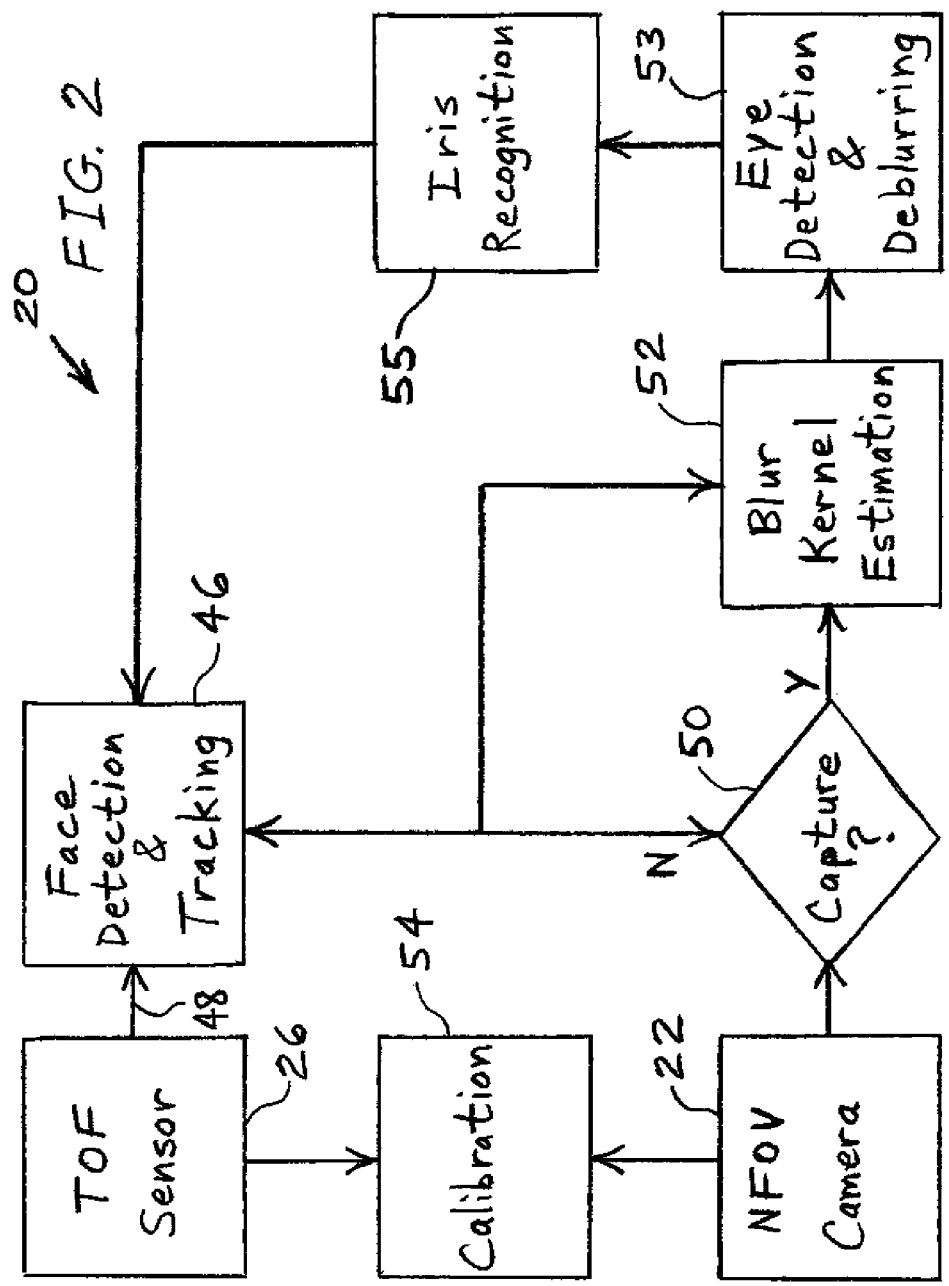
FIG. 2 is an operational block diagram of the iris capture system of FIG. 1.

An operational block diagram of system 20 is illustrated in FIG. 2. The three-dimensional information measured by depth sensor 26 may be used in various ways within system 20. First, face detection and tracking 46 may be performed on the up-sampled intensity images 48 captured by depth sensor 26. The three-dimensional position of the eyes may then be estimated from an upper portion of the detected face depth maps. The next eye location for the moving subject may be predicted accurately in real time. For example, time rates of change of the three-dimensional position of the eyes may be extrapolated to predict future eye locations. Second, the three-dimensional position may be used to determine whether eyes are within the field of view and whether the stand-off distance is within the depth of field. If these two conditions are satisfied, the NFOV camera may be instructed to perform image capturing, as at 50. Third, the depth information may be used to dynamically control the focus position of the lens of NFOV camera 22. Finally, the depth information can be used to estimate the blur kernel 52 for iris deblurring, as at 53. The deblurring may be useful in an iris recognition algorithm 55. More accurate depth information could be used to predict the speed and future positions of the human being so that the real or desired focus position can be estimated more accurately even when the system delay exists. The real or desired focus position may represent the focus position that is ideal for the future estimated position of the human being.

Calibration between NFOV camera 22 and depth sensor 26 may be performed, as at 54. In one embodiment, depth sensor 26 could be a TOF sensor. Many existing TOF sensors contain systematic depth bias from the demodulation of correlation function and incident lights, and so calibration, or so-called "precalibration," of the TOF sensor may obtain a better depth measurement. In a first step of a novel calibration method of the present invention, a large planar board may be positioned at different depths and with different orientations. A robust plane fitting may then be applied for the planar board at each position. The depth bias may be estimated by computing the difference between measured depth and the fitted plane. After the calibration of TOF sensor 26, the depth uncertainty may be greatly reduced, especially the depth uncertainty between 1.3 and 2 meters. In order to transform the depth in the coordinate system of TOF sensor 26 to that of NFOV camera 22, a full system calibration may be performed. The NFOV camera with a telephoto lens may be approximated as an affine camera. A planar checkerboard pattern is captured at different depths. As the correspondences between the two-dimensional points x from NFOV camera 22 and three-dimensional points X from TOF sensor 26 are known, the projection matrix P can be computed by minimizing the re-projection errors. The intrinsic and extrinsic matrices may be obtained by RQ decomposition of P.

Blur kernel estimation step 52 for iris deblurring is optional. As long as the iris deblurring algorithm needs to use the accurate depth information, the depth information provided by TOF sensor 26 may be sufficient. When depth information is not available in capturing systems, some statistics of the captured image (e.g., focus scores) may be used to estimate blur kernel.

Image blur may be modeled as a convolution process:

$$I = L \otimes h + n \quad (1)$$

where I, L, h, and n represent the blurred image; un-blurred image; point spread function (PSF) or blur kernel; and additive noise, respectively. For defocus blur, the PSF h depends on the circle of confusion R. For cameras with adjustable focus, R is a function of two parameters based on the typical pin-hole camera model. The two parameters are the distance from the object to the lens d and the distance between the lens and the image plane s, $$R = \frac{Ds}{2} \left| \frac{1}{f} - \frac{1}{d} - \frac{1}{s} \right| \quad (2)$$

where D is the radius of the lens, and f is the focal length of the lens. For cameras with fixed focus s, R is determined only by d.

The PSF h for the defocus blur may be modeled as a Gaussian kernel, $$h = \frac{1}{2\pi\sigma_h^2} e^{-\frac{x^2+y^2}{2\sigma_h^2}}. \quad (3)$$

Because the captured eye region is usually parallel to the image plane, the PSF h may be shift-invariant.

The blur kernel estimation method of the present invention will now be described with the assumption in place that the depth difference is measured. When the fixed focus cameras are used, it is relatively simple to estimate the kernel. The kernel estimation method of the present invention may deal with the more general case, i.e., cameras with adjustable focus. As mentioned above, the depth difference may be mainly caused by the system delay when a subject is moving.

As the lens focus position $p_f$ is proportional to the distance between the lens and image plane s, when the circle of confusion R is small enough, the relationship between the in-focus position of lens $p_f$ and d may be derived based on Equation (2), $$p_f = \frac{d}{k_1 d + k_2}. \quad (4)$$

Figure 3:
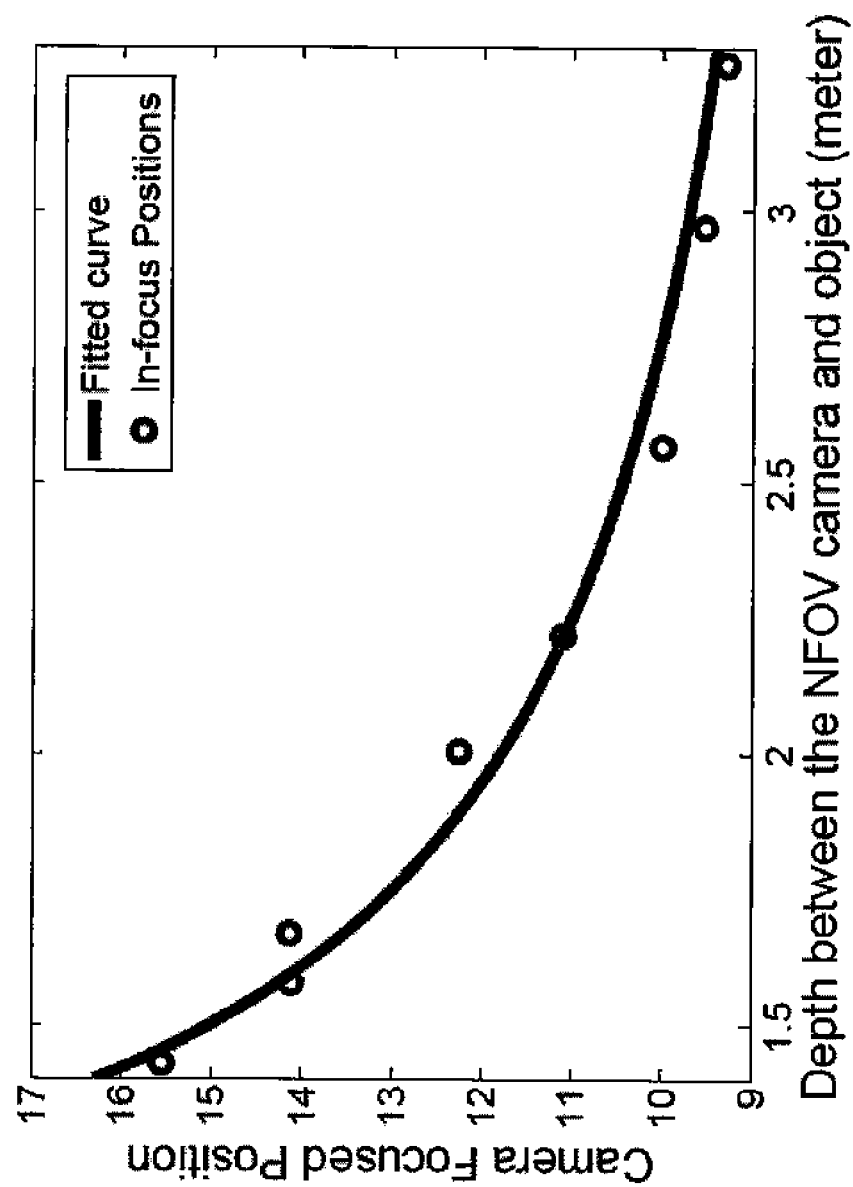
FIG. 3 is an example of a fitted curve for the measured focus positions of the camera of the system of FIG. 1 as a function of the depth between the camera lens and the object.

After measuring focus positions from in-focus images at different depths, $k_1$ and $k_2$ can be easily estimated by curve fitting using Equation (4). FIG. 3 shows an example of a fitted curve for the measured focus positions and depths.

As the standard deviation of the blur kernel Gaussian distribution $\sigma_h$ is proportional to R and s is proportional to $p_f$, when d is fixed, the relationship between $\sigma_h$ and $p_f$ may be derived, based on Equation (2), $$\sigma_h = |k_3 p_f + k_4|. \quad (5)$$

Although the parameters $k_1$, $k_2$, $k_3$ and $k_4$ are characteristics of the camera system, they have no obvious physical meaning or representation. The standard deviation $\sigma_h$, which defines the blur kernel Gaussian distribution, cannot be measured directly. Thus, the following novel algorithm of the present invention may estimate $\sigma_h$ and then learn $k_3$ and $k_4$ accordingly.

In a first step of the algorithm, in-focus and defocused checkerboard images are captured under different depths and different focus positions. As in-focus and defocused images are known, only $\sigma_h$ is unknown. The standard deviation $\sigma_h$ is estimated by ar $\text{gmin}_{\sigma_h} \|I - L \otimes h\|_2^2$. The subscript 2 in the formula denotes a Euclidean Norm or a L2-Norm.

In a next step, $k_3$ and $k_4$ are estimated by ar $\text{gmin}_{k_3, k_4} \|k_3 p_f + k_4 - \sigma_h\|_2^2$. FIGS. 4*a-g* show examples of the fitting results for $p_f$ and $\sigma_h$ based on Equation (5). FIGS. 4*a-g* are plots of the focus position of camera 22 versus a standard deviation of the blur kernel distribution for six different distances between camera 22 and the subject iris. The plot for each of the six distances is V-shaped, with the origin of the "V" being at the in-focus position corresponding to that distance. The parameter $k_3$ may represent the slope of a corresponding V-shaped plot in FIGS. 4*a-g*; and parameter $k_4$ may represent the y-intercept of the corresponding V-shaped plot. V-shaped plot 60 corresponds to a distance of about 3.30 meters; V-shaped plot 62 corresponds to a distance of about 2.97 meters; V-shaped plot 64 corresponds to a distance of about 2.56 meters; V-shaped plot 66 corresponds to a distance of about 2.00 meters; V-shaped plot 68 corresponds to a distance of about 1.58 meters; and V-shaped plot 70 corresponds to a distance of about 1.43 meters.

Each of the circles in FIGS. 4*a-g* represents an empirically-collected data point. The data points at the top (standard deviation=20) of FIGS. 4*a-g* are the images that are severely blurred. It may not be feasible to recover these kinds of severely blurred images in practice even with a large kernel size. Hence, these severely blurred images are treated as outliers and are not included in the estimation.

Based on FIGS. 3 and 4*a-g*, it can be concluded that the models described in Equations (4) and (5) may be used for real camera systems even though the derivation of Equations (4) and (5) is based on the traditional pin-hole camera model. A practical use of the plots of FIGS. 4*a-g* is to estimate the blur kernel when the subject is moving.

Figure 4A:
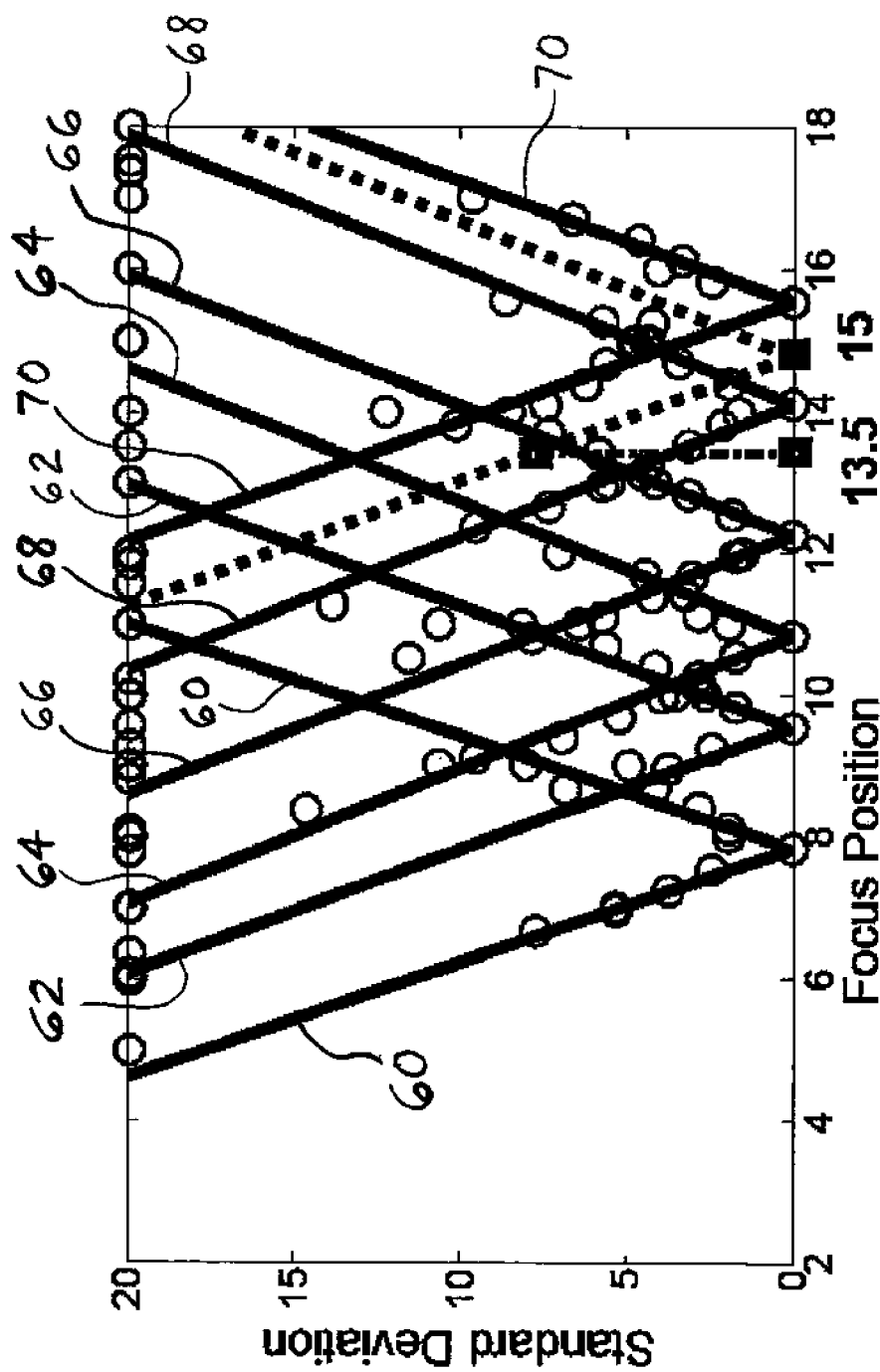
FIG. 4a illustrates examples of plots of the standard deviation of the blur kernel Gaussian distribution as a function of the focus position of the camera of the system of FIG. 1 for various distances between the camera and the iris according to one embodiment of a method of the present invention for visually recognizing an iris.
Figure 4B:
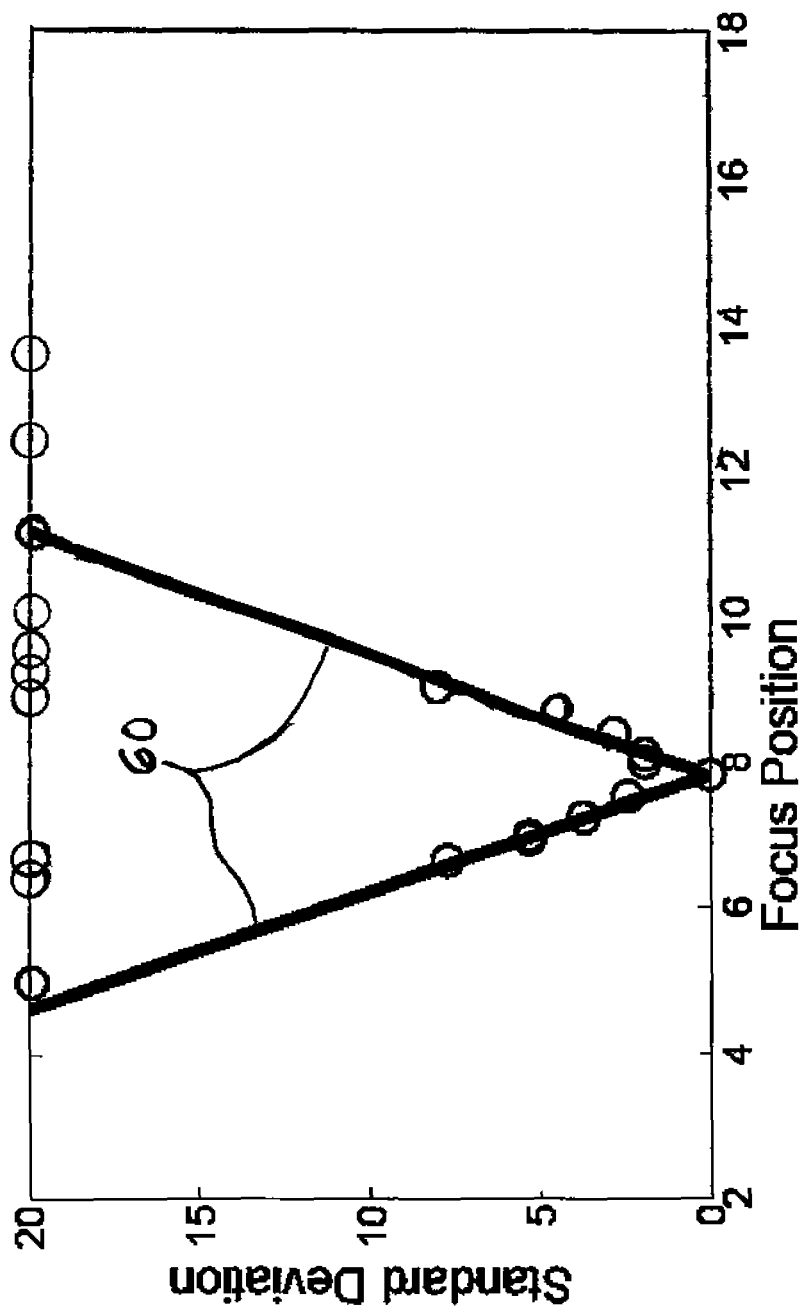
FIG. 4b is the plot of FIG. 4a corresponding to a distance of 3.30 meters between the camera and the iris.
Figure 4C:
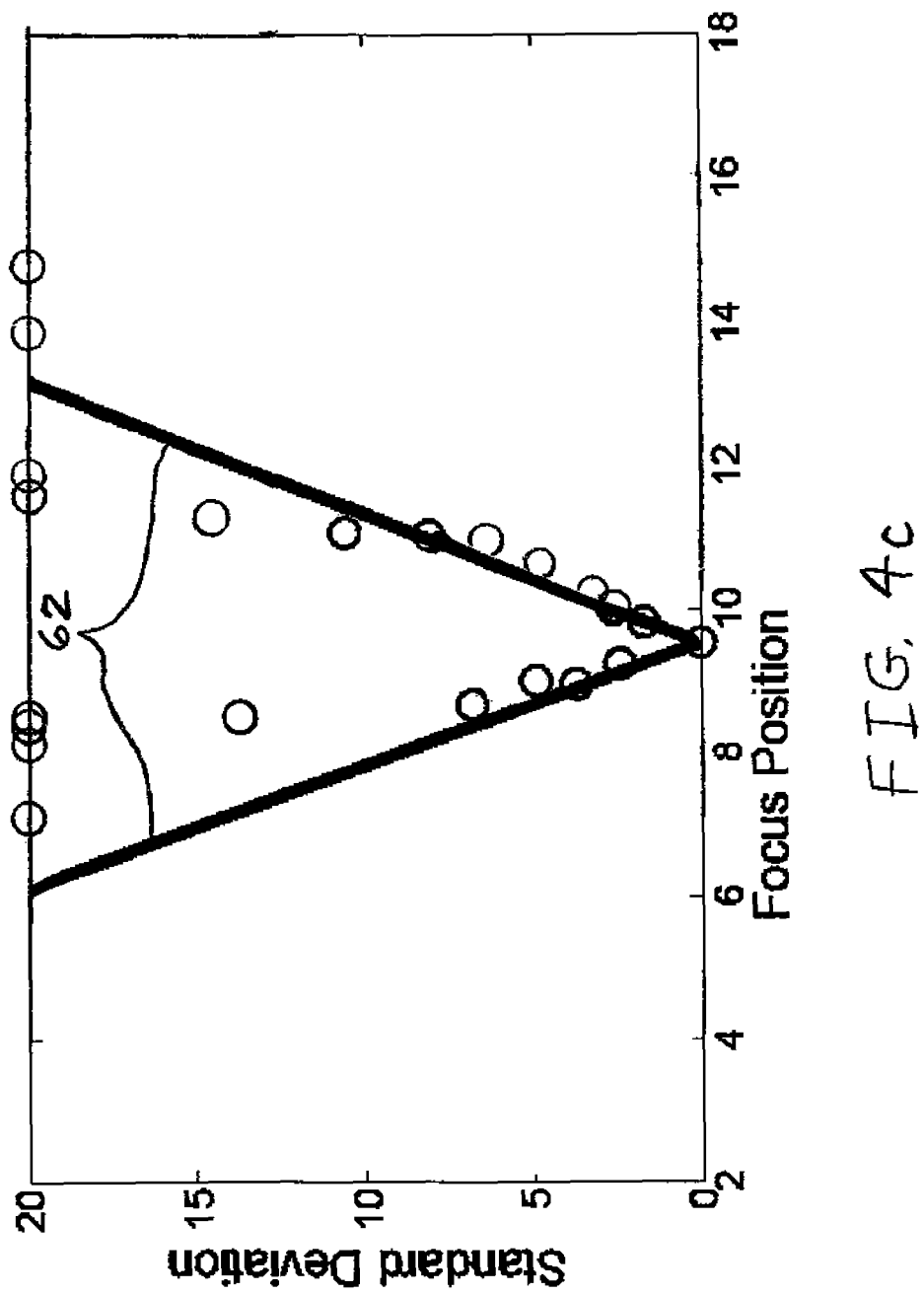
FIG. 4c is the plot of FIG. 4a corresponding to a distance of 2.97 meters between the camera and the iris.
Figure 4D:
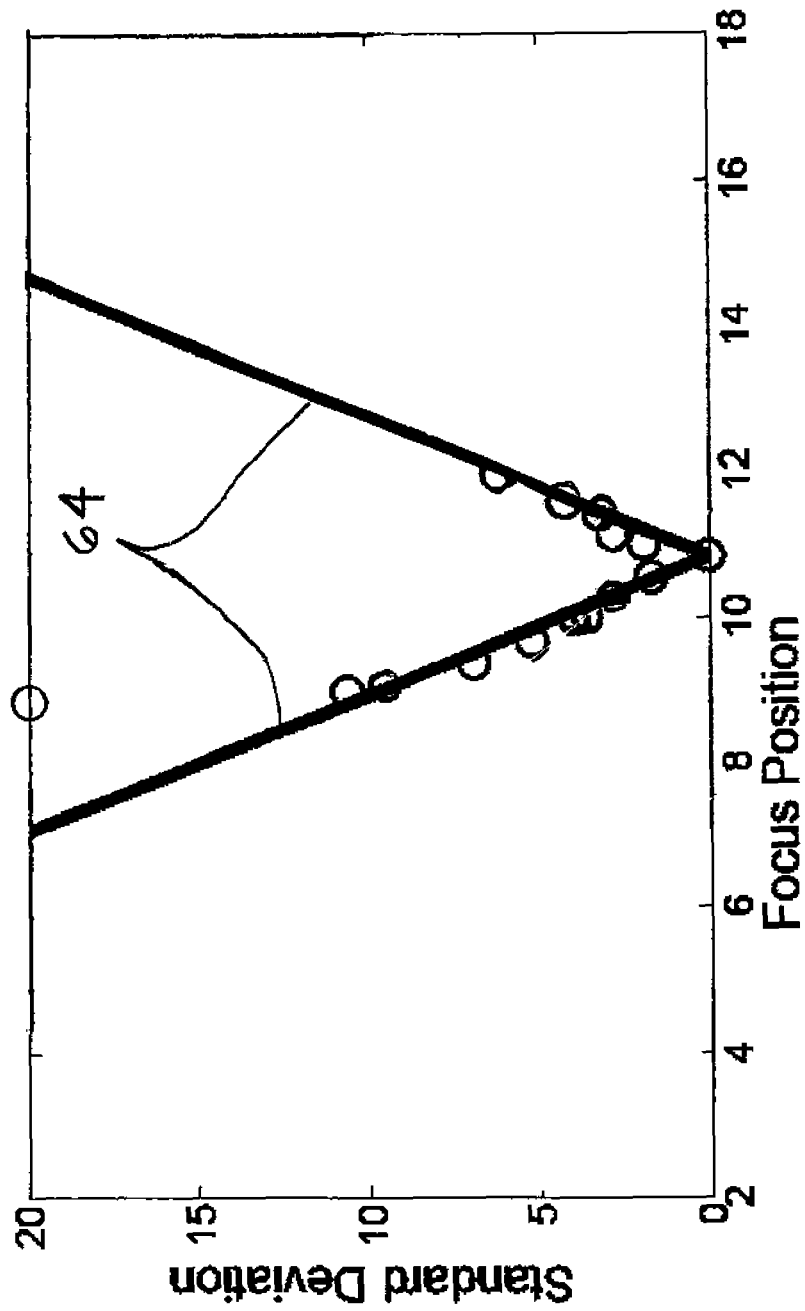
FIG. 4d is the plot of FIG. 4a corresponding to a distance of 2.56 meters between the camera and the iris.
Figure 4E:
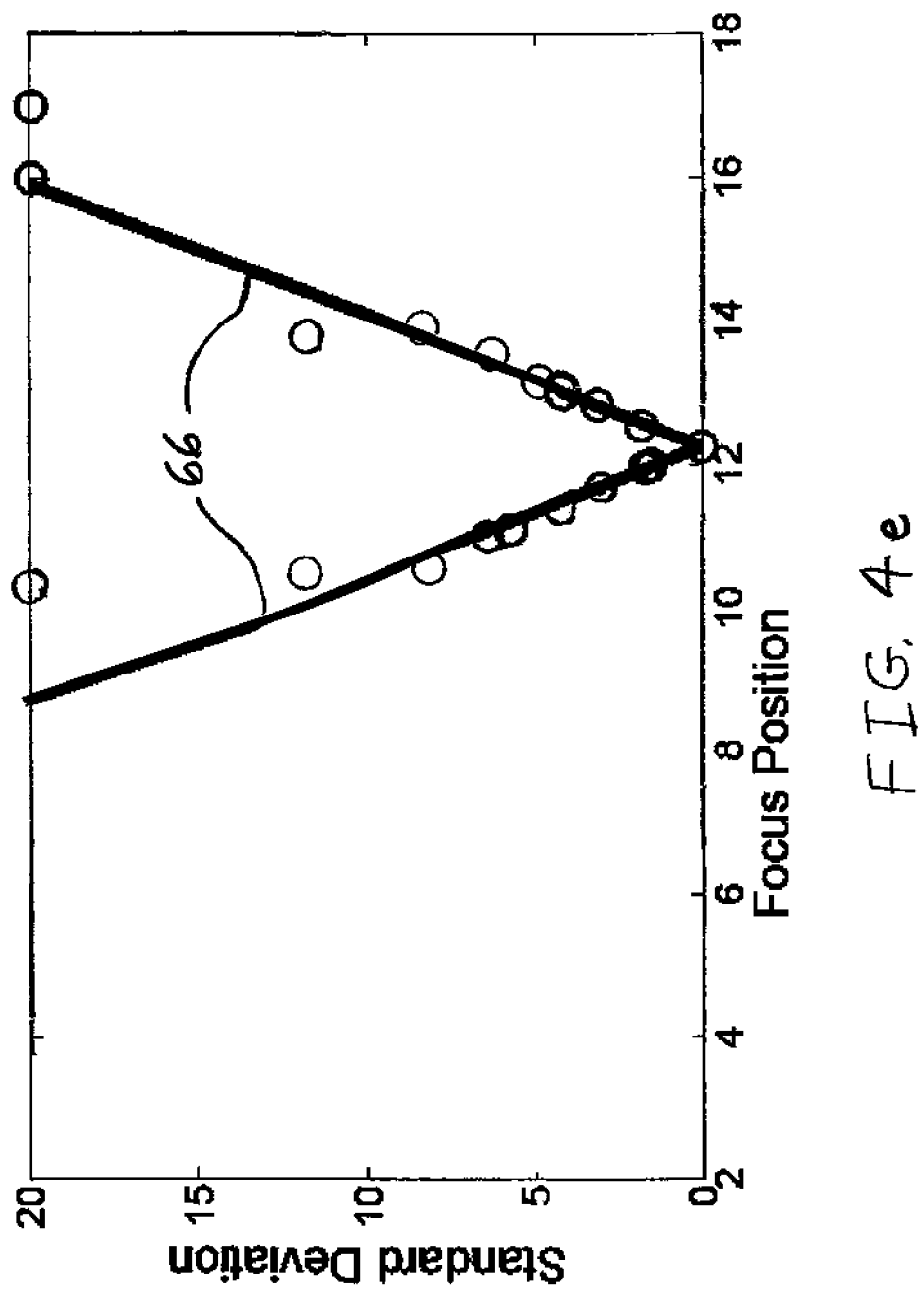
FIG. 4e is the plot of FIG. 4a corresponding to a distance of 2.00 meters between the camera and the iris.
Figure 4F:
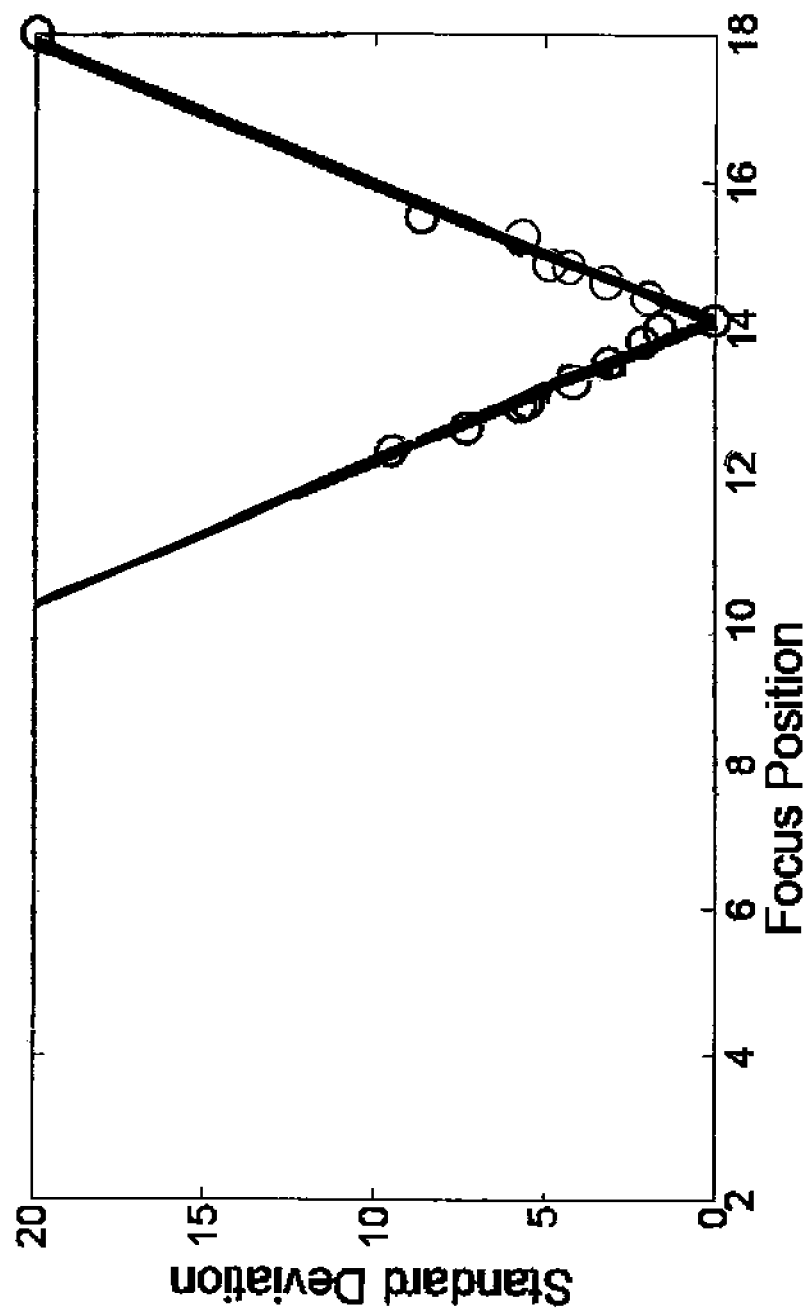
FIG. 4f is the plot of FIG. 4a corresponding to a distance of 1.58 meters between the camera and the iris.
Figure 4G:
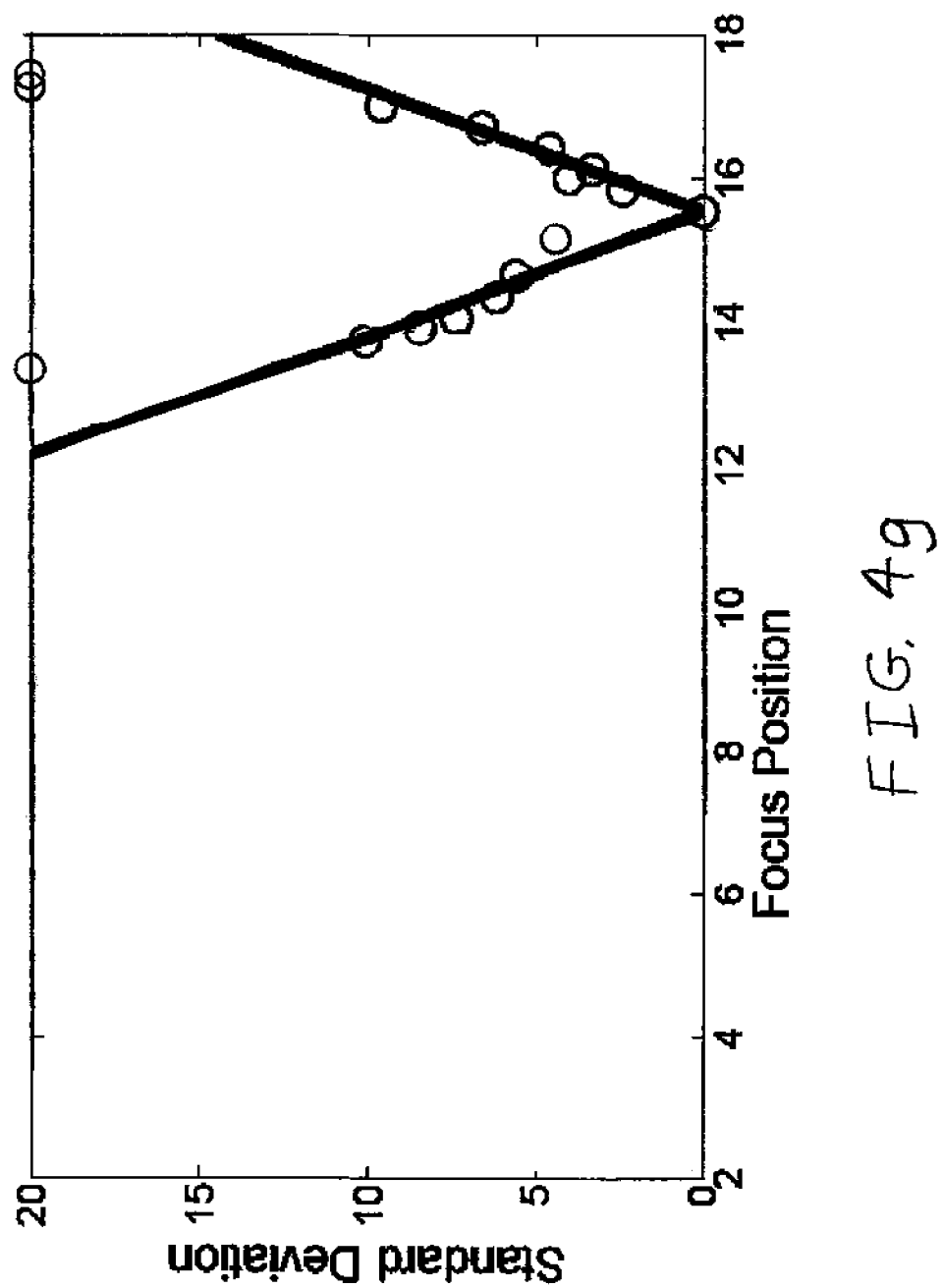
FIG. 4g is the plot of FIG. 4a corresponding to a distance of 1.43 meters between the camera and the iris.
Figure 4H:
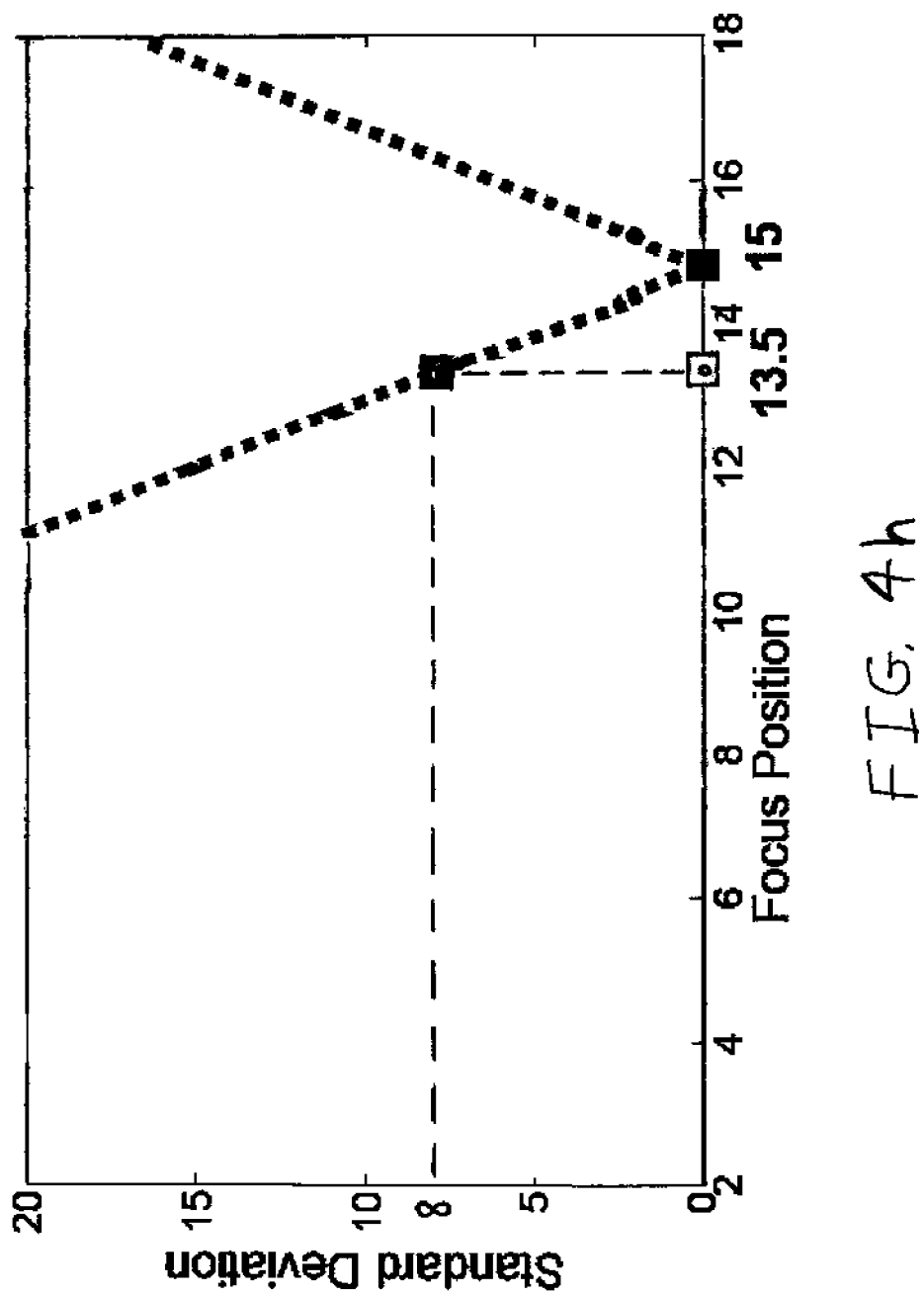
FIG. 4h is a plot illustrating how a standard deviation defining a blur kernel distribution appropriate for deblurring may be calculated according to one embodiment of a method of the present invention.

When a user enters the field of view of the capturing system, the three-dimensional position of the user's eyes after the system delay may be predicted. When the predicted eye position satisfies the triggering condition, the predicted in-focus position $\tilde{p}_f$ is computed using Equation (4) and the image is produced at this position. The correct (i.e., actual) depth at the time of image capture (after the system delay) is measured, and the correct or ideal in-focus position $\bar{p}_f$ corresponding to the actual depth measurement is computed. For example, assuming the correct or ideal in-focus position $\bar{p}_f$ is 15 (as shown as the origin of the V-shaped plot in FIG. 4*h*) for an actual, measured depth, a new model can be interpolated (i.e., Equation (5) with different values for $k_3$ and $k_4$). The new model is illustrated as the dashed V-shaped plot originating at focus position 15 in FIG. 4*h*. Assuming the predicted in-focus position $\tilde{p}_f$ that was actually used to produce the iris image is 13.5, as indicated by the rectangle at 13.5 in FIG. 4*h*, the standard deviation $\sigma_h$ that defines the blur kernel distribution appropriate for use in deblurring is shown to be approximately 8 in FIG. 4*h*. The standard deviation $\sigma_h$ may be computed by taking the predicted focus position of 13.5 that was actually used to produce the image, and plugging that value of 13.5 into Equation (5) along with the values of $k_3$ and $k_4$ that correspond to the actual depth measurement (i.e., the actual depth measurement that corresponds to an ideal focus position of 15).

The above-described calculation of the blur kernel Gaussian distribution may be used to unblur a captured blurred image as described in detail below. Particularly, the process of image deblurring may be formulated in the Bayesian framework by Bayes' theorem, $$P(L|\sigma_h, I) \propto P(I|L, \sigma_h)P(L)$$

where $P(I|L,\sigma_h)$ is the likelihood that L is the clear image given a blur kernel defined by a Gaussian distribution that is, in turn, defined by a standard deviation $\sigma_h$. $P(L)$ represents the prior on the un-blurred image L. A prior probability, or a "prior," is a marginal probability, interpreted as what is known about a variable in the absence of some evidence. The posterior probability is then the conditional probability of the variable taking the evidence into account. The posterior probability may be computed from the prior and the likelihood function via Bayes' theorem.

Different priors chosen in this framework may lead to different deblurring algorithms with different performances. The novel iris deblurring algorithm of the present invention may be applied in any iris capture system to handle defocus blur. The prior on the un-blurred image L may depend upon three prior components that are based on global and local iris image statistics:

$$P(L) = P_g(L)P_p(L)P_s(L).$$

The first prior $P_g(L)$ may be computed from an empirically-determined global distribution of the iris image gradients; $P_p(L)$ may be computed based on characteristics of dark pupil region; and $P_s(L)$ may be computed from the pupil saturation region (i.e., the highlight region of the pupil that is saturated with intensity values of high brightness). For general image deblurring, the global distribution of iris image gradients may be approximated by a mixture of Gaussian distributions, exponential functions, and piece-wise continuous functions. Mixture Gaussian distributions are described in "Removing camera shake from a single photograph", R. Fergus, B. Singh, A. Hertzmann, S. T. Roweis, and W. T. Freeman, ACM Transactions on Graphics, 2006; exponential functions are described in "Image and depth from a conventional camera with a coded aperture", A. Levin, R. Fergus, F. Durand, and W. T. Freeman, ACM Transactions on Graphics, 2007; and piece-wise continuous functions are described in "High-quality motion deblurring from a single image", Q. Shan, J. Jia, and A. Agarwala, In SIGGRAPH, 2008, each of which is incorporated by reference herein in its entirety.

Figure 5:
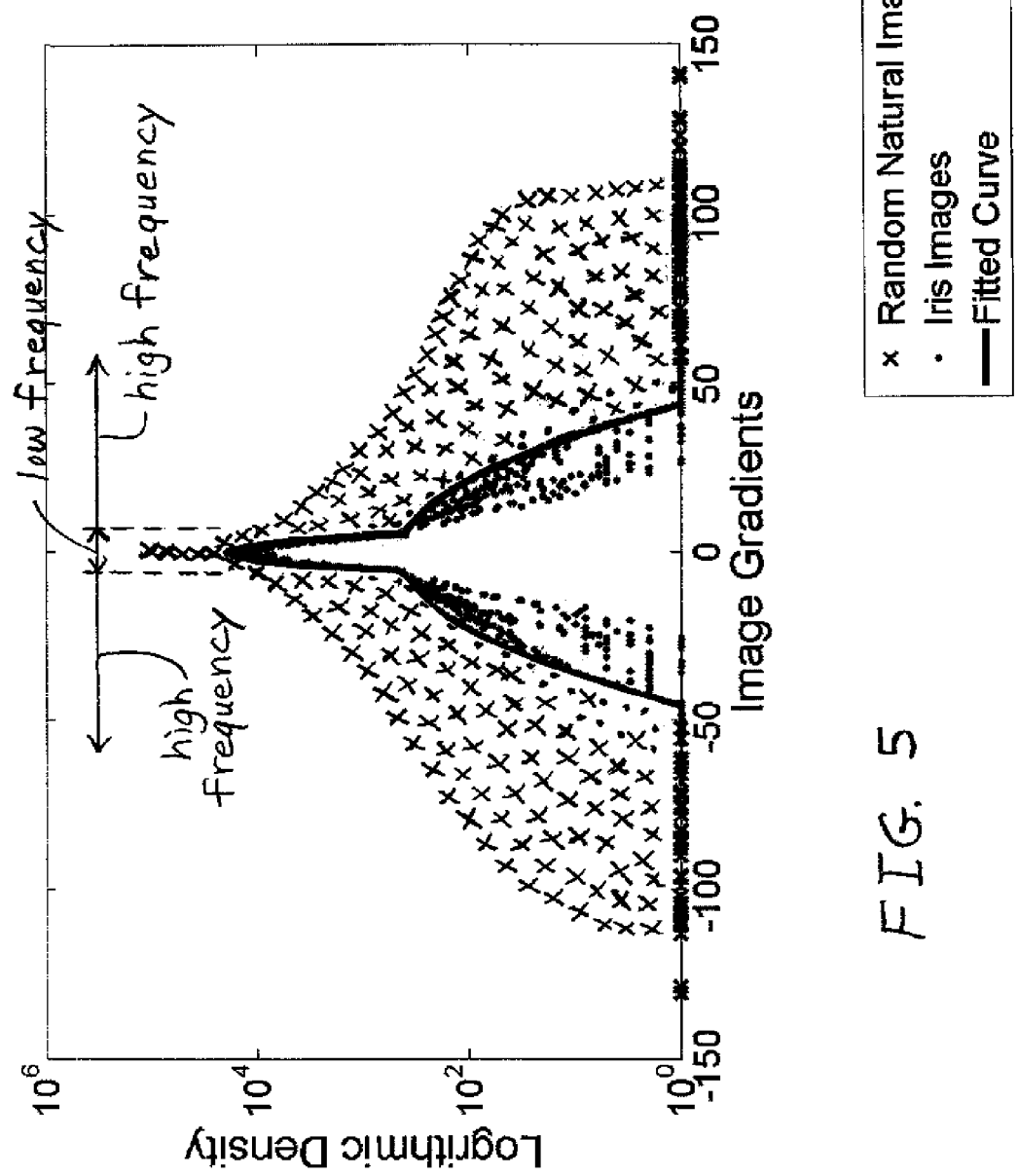
FIG. 5 is a plot of the distributions of image gradients of random natural images and of global iris images.

Because the application domain is iris images rather than natural images, according to one embodiment of the present invention, the global distribution may be computed from iris images only. As illustrated in FIG. 5, the distribution of general natural images (i.e., any images found in nature, such as sky, water, landscape) has a greater uncertainty than the distribution of global iris images. The present invention takes advantage of the tight range of the global iris image statistics.

As a result of the tighter iris image statistics, the distribution of iris image gradients is a stronger prior. A two-piecewise quadratic function (i.e., a piecewise quadratic function having two separate, continuous portions) may be used to approximate the distribution so that the optimization based on this Bayesian problem becomes simpler and more efficient. A general form of the two-piecewise quadratic function may be:

$$P_g(L) \propto \begin{cases} \Pi_i e^{a_1(\partial L_i)^2 + b_1}, & |\partial L_i| \le k \\ \Pi_i e^{a_2(\partial L_i)^2 + b_2}, & |\partial L_i| > k \end{cases}$$

where $\partial L_i$ is the gradient for a pixel and k is the threshold between two functions. Such a two-piecewise quadratic function may be represented by the fitted curve in FIG. 5, wherein the threshold k is at the transitions between the low frequency and high frequency regions.

The second $P_p(L)$ and third $P_s(L)$ priors may be computed from the local pupil region because the dark pupil region is likely to be smooth as compared with the nearby iris patterns, and the highlight region is likely saturated. Therefore, these two priors may be particularly useful in recovering nearby iris patterns. As the smooth pupil region tends to have small gradients that are not sensitive to the defocus blur, and the saturated highlight region tends to contain the highest intensity, the two priors may be computed as following:

$$P_p(L) \propto \prod_{i \in \Omega_1} N(\partial L_i - \partial I_i \mid 0, \sigma_p)$$

$$P_s(L) \propto \prod_{i \in \Omega_2} N(L_i - 255 \mid 0, \sigma_s),$$

where $\Omega_1$ is the dark pupil region (i.e., excluding the highlight region), and $\Omega_2$ is the saturated highlight region within the pupil. The dark pupil region and the saturated highlight region within the pupil can be detected by image processing techniques, such as thresholding, erosion and dilation. The 255 term in the $P_s(L)$ formula represents the highest (i.e., whitest) color value on a scale of 0 to 255.

Putting all of these priors together, this iris deblurring problem may be solved by minimizing an energy function E in the following quadratic form:

$$E \propto \|I - L \otimes h\|^2 + \lambda_1(\|a_1(\partial L)^2 + b_1\| \cdot M_1 + \|a_2(\partial L)^2 + b_2\| \cdot M_2) + \lambda_2(\|\partial L - \partial I\|^2 \cdot M_3 + \|L - 255\|^2 \cdot M_4),$$

where $M_1$, $M_2$, $M_3$, and $M_4$ are masks of low-frequency region, high-frequency region, dark pupil region, and highlight region in the pupil; I is the known blurred image captured by the camera lens; h is the blur kernel, which may be estimated as discussed in detail above; and L is the clear image that is being determined. Thus, given known values for the blurred image I and the blur kernel h, an image L may be determined that minimizes E, and this image L may be used as a representation of a clear, unblurred version of the produced blurred image I.

The deblur kernel h can be estimated based on the depth information or focus scores. If the blur kernel is not known, it is possible to add a Gaussian prior in place of the blur kernel in order to convert the non-blind deconvolution into a blind one, which still can be solved by the optimization framework.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of capturing an image of an iris, said method comprising the steps of:
   using a camera lens with a focus position to produce an image of a living being's eye;
   sensing an actual position of the living being's eye at a point in time at which the camera lens produced the image of the living being's eye; and
   determining a Gaussian blur kernel distribution based upon:
      the focus position of the camera lens; and
      the actual position of the living being's eye at the point in time; and
   using the blur kernel distribution to digitally unblur the produced image.

2. The method of claim 1 comprising the further step, before the camera lens produces the image of the eye, of adjusting the focus position of the lens based upon a predicted position of the eye at the point in time at which the camera lens produces the image of the eye.

3. The method of claim 2 comprising the further steps of:
   collecting empirical data regarding in-focus positions of the lens at various distances between the lens and an iris whose image is to be captured by the lens;
   determining, based on the empirical data, a first mathematical relationship between the in-focus position of the lens and a distance between the lens and an iris whose image is to be captured by the lens; and
   using the first mathematical relationship in adjusting the focus position of the lens.

4. The method of claim 3, the determining of the Gaussian blur kernel distribution further comprising:
   using the first relationship to estimate a second mathematical relationship between the in-focus position of the lens and a standard deviation defining the Gaussian blur kernel distribution.

5. The method of claim 4 wherein the second mathematical relationship is a linear relationship.

6. The method of claim 1 wherein the sensing step is performed using a depth sensor.

7. A method of visually recognizing an iris, said method comprising the steps of:
   predicting a position of an eye of a living being at a future point in time;
   adjusting a focus position of a camera lens, the adjusting being dependent on the predicted position;
   using the camera lens with the adjusted focus position to produce an image of the living being's eye at the point in time;
   sensing an actual position of the living being's eye at the point in time;
   determining a Gaussian blur kernel distribution based upon:
      the adjusted focus position of the camera lens; and
      the actual position of the living being's eye at the point in time; and
   using the blur kernel distribution to digitally unblur the produced image.

8. The method of claim 7 comprising the further steps of:
   collecting empirical data regarding in-focus positions of the lens at various distances between the lens and an iris whose image is to be captured by the lens;
   determining, based on the empirical data, a first mathematical relationship between the in-focus position of the lens and a distance between the camera and an iris whose image is to be captured by the camera system; and
   using the first mathematical relationship in adjusting the focus position of the lens.

9. The method of claim 7 comprising the further step of using the first relationship to estimate a second mathematical relationship between the in-focus position of the lens and a standard deviation defining the Gaussian blur kernel distribution, the determining of the Gaussian blur kernel distribution including using the second relationship to calculate the standard deviation based upon a difference between:
   the adjusted focus position of the camera lens; and
   a desired focus position of the lens corresponding to the actual position of the living being's eye at the point in time.

10. The method of claim 9 wherein the second mathematical relationship is a linear relationship.

11. The method of claim 7 wherein a fixed position is used as a proxy for the predicted position of the eye.

12. The method of claim 7 wherein the sensing step is performed using a depth sensor.

13. A method of estimating a blur kernel distribution for visual iris recognition, said method comprising the steps of:
   determining a first mathematical relationship between an in-focus position of a camera lens and a distance between the lens and an iris whose image is to be captured by the lens;
   estimating a second mathematical relationship between the in-focus position of the lens and a standard deviation defining a Gaussian blur kernel distribution;
   predicting a position of an eye of a living being at a future point in time;
   adjusting a focus position of the camera lens based upon the predicted position of the eye;
   using the camera lens with the adjusted focus position to produce an image of the living being's eye at the point in time;
   sensing an actual position of the living being's eye at the point in time;
   using the first mathematical relationship to ascertain a desired focus position of the lens based upon the actual position of the living being's eye at the point in time;
   using the second mathematical relationship to calculate a standard deviation defining a Gaussian blur kernel distribution, the calculating being based upon a difference between the adjusted focus position and the desired focus position of the lens; and
   digitally unblurring the produced image by using the blur kernel distribution defined by the calculated standard deviation.

14. The method of claim 13 wherein the first mathematical relationship is determined based on empirical data.

15. The method of claim 13 wherein the second mathematical relationship is a linear relationship that is dependent upon the first mathematical relationship.

16. The method of claim 13 wherein a fixed position is used as a proxy for the predicted position of the eye.

17. The method of claim 13 wherein the first mathematical relationship is used in adjusting the focus position of the camera.

18. The method of claim 13 wherein the sensing step is performed using a depth sensor.

19. The method of claim 13 comprising the further step of determining whether the captured image needs to be modified based on the estimated blur kernel, which is realized by identifying a defocus-blur level of the captured iris image based on the estimated blur kernel.

* * * * *